United States Patent [19]
Greene

[11] 4,022,025
[45] May 10, 1977

[54] CYCLICAL ENERGY TRANSFER METHOD AND APPARATUS

[76] Inventor: Clarence Kirk Greene, 100 N. Arlington Ave., Reno, Nev. 89501

[22] Filed: Nov. 25, 1974

[21] Appl. No.: 526,855

[52] U.S. Cl. .................................. 60/641; 166/302; 165/45; 60/690; 60/688
[51] Int. Cl.² .................................... F03G 7/00
[58] Field of Search ............... 60/641; 165/45; 166/302, 274, 275

[56] References Cited
UNITED STATES PATENTS

| | | | |
|---|---|---|---|
| 3,580,330 | 5/1971 | Maugis | 165/45 |
| 3,817,038 | 6/1974 | Paull et al. | 60/641 |
| 3,862,545 | 1/1975 | Ellis et al. | 60/641 |

FOREIGN PATENTS OR APPLICATIONS 422,814    1947    Italy ..................................... 165/45

*Primary Examiner*—Allen M. Ostrager
*Attorney, Agent, or Firm*—Herbert C. Schulze

[57] ABSTRACT

This is a method and apparatus for practicing the method, for the utilization of geothermal energy for the production of power, wherein a fluid (stream and/or hot liquid, or the like) from a geothermal aquifer is brought up the surface of the Earth through several wells of a group, and returned as condensate after passing through an energy extractor through another well, or wells of the group, and wherein a reversible flow arangement is provided whereby the fluid may be taken from different wells and utilized with the condensate going back through different wells successively and in turn by means of which salt deposits are eliminated, the heat of the aquifer is maintained, and maximum energy exraction is achieved.

5 Claims, 3 Drawing Figures

4,022,025

CYCLICAL ENERGY TRANSFER METHOD AND APPARATUS

CROSS-REFERENCE TO RELATED PATENT APPLICATIONS

This patent application is related to my copending application Ser. No. 466,870 filed May 6, 1974 now U.S. Pat. No. 3,874,174.

This application is also related to my two applications for patent being filed concurrently herewith entitled: GEOTHERMAL DUAL ENERGY TRANSFER METHOD AND APPARATUS and GEOTHERMAL ENERGY UTILIZATION METHOD AND APPARATUS.

BACKGROUND OF THE INVENTION

1. Field of the Invention

This invention is in the general field of energy extraction, and more particularly in the field of energy extraction wherein the energy stored in hot brine or other liquid within the Earth is used to create power on the surface of the Earth.

The invention is more particularly in the field of such energy extraction and utilization of the stored energy wherein the hot liquid within the Earth is caused to vaporize and pass through the well casings of several wells of a group of wells, to an energy extracting device on the surface of the Earth, with the condensate resulting therefrom, being passed to one or more adjacent wells of the group with provision being provided for alternately receiving the steam and disposing of the condensate from different wells and into different wells in a cycle.

2. Description of the Prior Art

It is well known, that there are pools of extremely hot liquids beneath the surface of the Earth. Generally, these pools of liquid are in the form of brine, at a considerable depth, and it has been heretofore known to pump such hot brine to the surface and utilize the hot brine for running turbines or other such devices in order to create power on the surface of the Earth. After the initial extraction of power from the hot brine, it is customary to return the same to the brine pool through an appropriate conduit or the like. One such systems is illustrated in my co-pending U.S. Pat. application, Ser. No. 466,870, filed May 6, 1974, now U.S. Pat. No. 3,874,174.

It is also known to utilize steam, eminating from a well or the like, in an energy extraction device allowing condensate to return through the same well, or in some adjacent area or to have it otherwise utilized.

In the particular invention disclosed in this patent application, several wells of a group of wells are used for the source of steam, with one or more wells in turn used for the receipt and disposition of the condensate, with reversible arrangements provided wherein every well in the group, will, at one time or another, in a regular cycle, become the source of steam for the major portion of the time and will receive the condensate for a minor portion of the time. This is unknown and unique.

SUMMARY OF THE INVENTION

Those engaged in the generation of power and exploration of natural sources of energy have, for many years, known of, and studied, the extensive pools of extremely hot liquids at various locations beneath the surface of the Earth. In recent years, this study and the utilization of the energy stored in such pools of hot liquid have received increasing attention and utilization.

When the extremely hot liquids themselves are utilized directly, extreme problems of scaling, and the like, on the apparatus exist. My previously referenced copending U.S. Pat. application, Ser. No. 466,870, filed May 6, 1974, now solves a great number of these problems in connection with the use of hot brine. Such systems, even that proposed in my said patent application, still have certain limitations, including, the limitation of necessity of pumps and the like.

Another approach to the utilization of the energy stored in the hot liquids beneath the surface of the Earth, has been to attempt to capture and utilize the steam which can escape from such pools of liquids. In this case, it is customary to drill a well and to allow steam to escape from the surface of the liquid through the well, and to channel it into an appropriate energy extracting device on the surface of the Earth. The condensate resulting from the energy extracting device, is either channeled back into the same well, or other uses or disposition may be made, including the diversion of the condensate back beneath the surface of the Earth. However, due to the extreme quantities of dissolved materials in the hot liquids beneath the surface of the Earth, any such operations have a very limited life, due to the clogging of the well by the deposition of the solids. Over a relatively long period of time, these solids may disappear if the well is capped and not utilized for energy extracting purposes.

While it is possible to use the steam wells in the manner presently known, and above briefly described, it is inefficient and ineffective, due to the necessity of cessation of operations for extended periods of time.

I have devised a method and an apparatus for practicing the method, by which wells, in well defined groups, may be operated continuously and very efficiently. In my method, I first lay out a series of wells, for example 10 wells, in a definite configuration with proper spacing so as to insure adequate flow of hot aquifer to each of the wells. For example, 10 wells can be spaced approximately equally distant from one another within one section of land.

After laying out the wells in the proper manner, and drilling them, I arrange piping in such manner that it is possible to what amounts to a manifolding system, to have all except one (or any other number desired) interconnected through the manifold to an energy extracting means. To a second manifold, I have the condensate from the energy extracting means returning to one or more of the wells which are not presently then connected to the steam supply manifold. I also have optional arrangements for introducing other water into the condensate line, so as to provide additional water into the wells receiving the condensate.

When a well of this nature has passed steam for some period of time, there becomes a deposition of salt which ultimately seals off the well in such manner that it is ineffective for heat transfer. By means of this system, which I have devised, however, it is now possible to keep a group of wells, such as described, running continuously by alternating the well, or wells receiving the condensate and/or waters in a regular cycle such that the deposition of salt and the like never reaches a serious point before it is subjected to the returning condensate and other water for dissolution of such deposits.

In practicing my method, and in a preferred form, the 10 wells will be connected to two manifolds, one manifold being connected to an intake of an energy extracting arrangement, and the other manifold being connected to the exhaust of the energy extracting arrangement from which will normally issue condensate and/or steam with little residual heat energy.

By the injection of additional water into the condensate manifold, and particularly by providing a venturi arrangement at the point of entrance of the condensate to the manifold, additional values may be achieved, both in enhancing the action of the steam in passing through the energy extractor, and in creating an accelerated dissolving action upon the solids which may have been deposited in the well or wells now receiving the condensate.

At a time, based upon the rate of deposition of solids, the well, or wells receiving condensate are closed from the condensate manifold and opened to the steam supply manifold. At the same time, another well, or wells, which now have some solids deposited on their interiors, will be closed from the steam supply manifold and will receive the condensate. In this manner, the wells are kept continually cleaned. Also, the condensate and additional waters placed therein, are given ample opportunity to disperse throughout the hot aquifer and to flow from one to another of the wells which are actually supplying the heat. This enhances the heat activity and energy extraction, and also insures maximum life of the geothermal field.

It is an object of this invention effectively to extract energy from the heat of liquids beneath the surface of the Earth, through the utilization of steam flowing through an energy extractor by reason of the flow caused by condensation within the energy extraction circuit.

It is another object of this invention to provide a system for utilizing fluid from adjacent wells, wherein reverse flow is achieved such that adjacent wells alternately dispense fluid and receive condensate or other return material.

Another object of this invention, is to provide a method such as described, whereby the condensate will cause dissolution of solids deposited in a well.

Another object of this invention, is to provide a method such as described, wherein a group of wells for supplying fluid, may be worked in cooperation with one another wherein a larger number of wells are supplying steam than are receiving the expended condensate, and wherein the wells alternately supply fluid and receive relatively colder fluid in a predetermined cycle.

Another object of this invention is to enhance the flow of high pressure fluid from the supply wells by inserting colder drain material into the return line so as to reduce the pressure therein.

The foregoing and other objects and advantages will be understood by those skilled in the art, upon reading the following description of a preferred embodiment in conjunction with the appended drawings.

DESCRIPTION OF A PREFERRED EMBODIMENT

Figure 1:
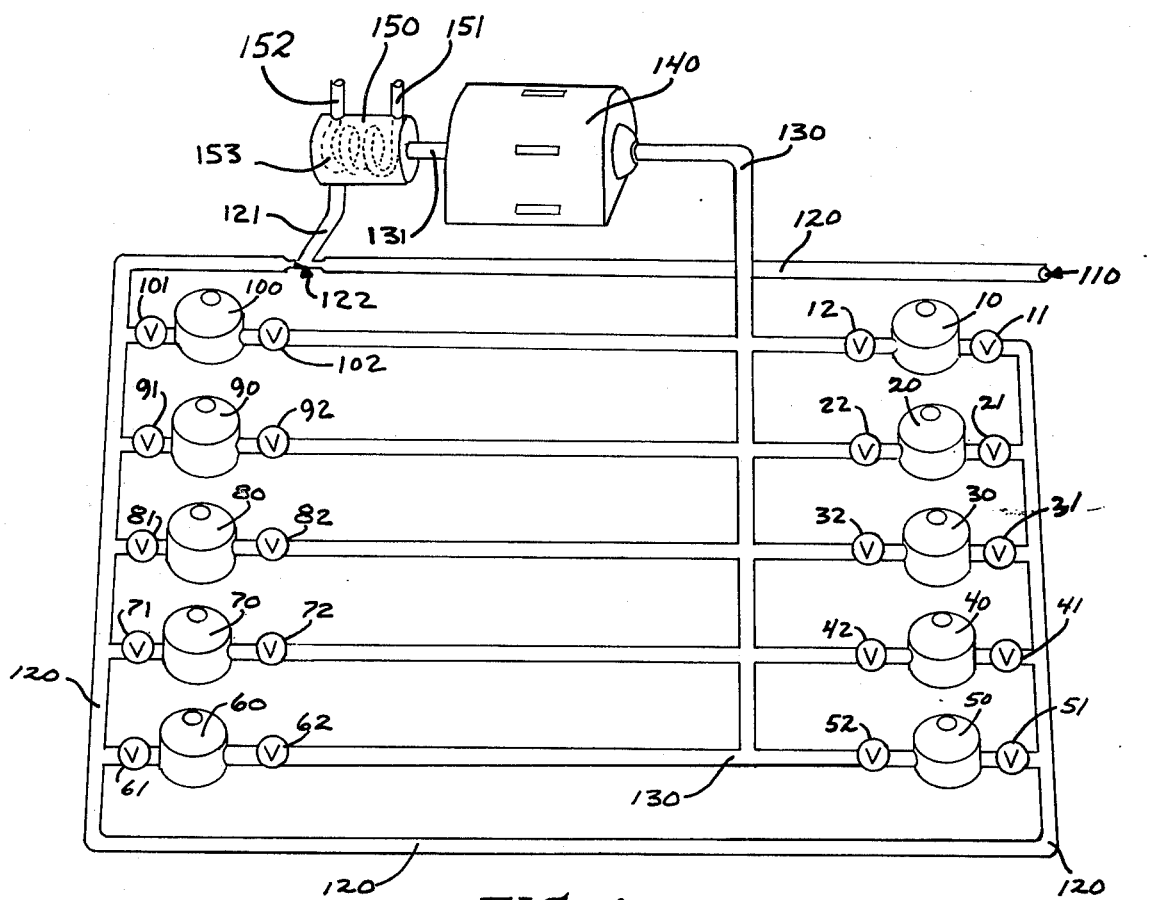
FIG. 1 is a schematic perspective of a preferred embodiment of a group of wells for practicing the method of this invention.

FIG. 1 illustrates schematically a field of wells. It is to be understood that these wells may be located, for example, over a complete section of land or the like, and will not necessarily be extremely close to one another in geographical location.

In this particular illustration, a group of 10 wells, 10, 20, 30, 40, 50, 60, 70, 80, 90, and 100 are represented. Each of the wells has a valve in piping connected thereto as indicated. The piping generally 120 is one network of piping which interconnects to each of the wells through valves 11, 21, 31, 41, 51, 61, 71, 81, 91, and 101 respectively. The other network of piping generally 130 is likewise connected to each of the wells through valving 12, 22, 32, 42, 52, 62, 72, 82, 92, and 102. The piping 130 connects to a blower 140 if desired, and from thence by piping 131 to energy extracting device 150. The piping 120 has inserted therein at an appropriate location a venturi arrangement 122. The venturi arrangement is so provided that the condensate from energy extractor 150 flows through pipe 121 into the throat of the venturi 122. While details of construction have not been shown, such arrangement is known to those skilled in the art.

The power producing or energy extracting arrangement for the energy extractor may be provided through a coil 153 having outlets 151 and 152 which could pass to a turbine or the like in a manner known to those skilled in the art.

A source of water 110 is interconnected to piping 120 by means not shown but understood by those skilled in the art. Such water may preferably be irrigation drainage or the like which frequently is available near areas of geothermal activity.

In operation, generally, one of the wells only will be receiving condensate from the energy extractor and through the pipe 121. The drainwater 110 will be passing through the venturi arrangement 122 and will draw the condensate into the piping 120 in a manner known to those skilled in the art. Assuming, and in accordance with the arrangement with FIG. 2, that well 50 is receiving the condensate, it will be receiving condensate through valve 51 which will be open, and its valve 52 will be closed. All of the other wells may preferably have their valves discharging fluid 12, 22, 32, 42, 52, 62, 72, 82, 92, and 102 respectively open. These other wells will have their valves 11, 21, 31, 41, 51, 61, 71, 81, 91, and 101 closed. Thus the condensate may only flow into well 50 and fluid will be eminating from all of the other wells and passing through the ducting 130 to the blower 140 which will enhance the passage of the fluid into the energy extractor 150 where the power will be generated in a manner known to those skilled in the art. The condensate or other return fluid, will then pass through pipe 121 into the throat of the venturi 122 and thus through the piping, enhanced by the passage of drainwater 110, into well 50.

Figure 2:
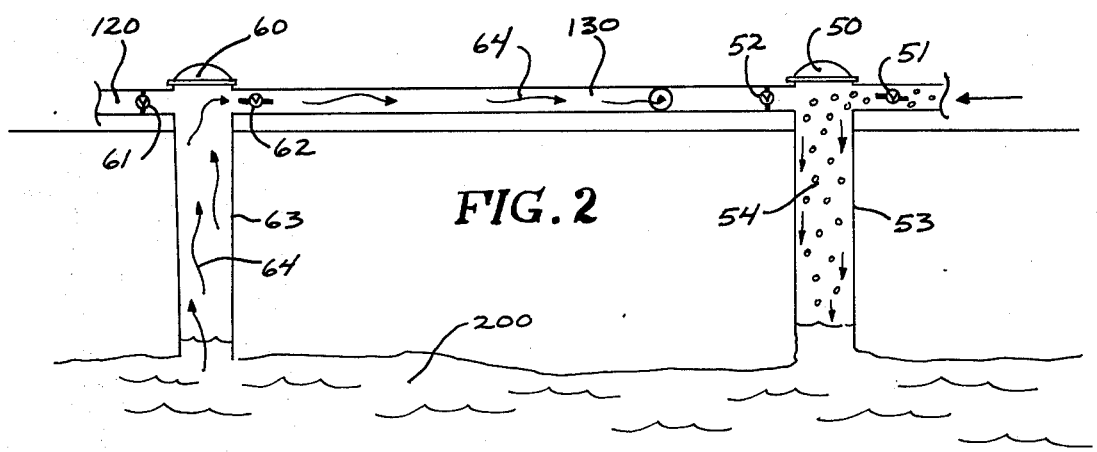
FIG. 2 is a schematic sectionalized view, somewhat reduced, representing two wells of the system.

Turning attention particularly to FIG. 2, there is a schematic representation of wells 60 and 50. The piping network generally 120 is shown as it enters both of the wells through the valves 61 and 51. The network of pipes 130 is shown connected through valves 62 and 52 to the respective wells 60 and 50.

In this particular instance, it is well 50 which is receiving the condensate, and well 60 is dispensing the stream.

The well casing 53 and 63 respectively provide the conduit through the Earth to the hot aquifer beneath the Earth, which aquifer is indicated by the reference numeral 200.

As indicated, fluid 64 flows through well casing 63 upward and through the piping network 130. The fluid is blocked from passing into network 120 by the closed valve 161, and is allowed to pass through the open valve 62. The fluid 64 is likewise prevented from flowing towards well 50 by the closed valve 52.

The open valve 51 allows the condensate 54 to flow as indicated from the piping network 120 into the well casing 53 and back down into the aquifer 200.

During the passage of the condensate 54, which is mixed with drainwater 110 in a preferred embodiment, any scaling or the like within the casing 53 is gradually removed.

While FIG. 2 illustrates only two wells in operation, it is to be understood that all of the other wells will be connected in a like manner with 60 in a preferred operation of this method. If, however, the condensate is such, in volume, that more than one well is required for its return, additional wells may be interconnected with well 50 by the appropriate opening of their valves as will be clear to those skilled in the art.

Upon an appropriate and predetermined cycle, the well 50 will be reversed in its operation having its valve 51 closed and valve 52 opened. Likewise each of the other wells including the well 60 from time to time will be so cycled as to be receiving the condensate, and thus, while during the major portion of their operation, each of the wells will be dispensing working fluid in the manner as shown for well 60 in FIG. 2, at the same time, it is to be understood that from time to time each of the wells will receive condensate (mixed with drainwater) during which period of time each of the wells will be appropriately cleaned of the scaling by the action of the condensate and drainwater dissolving and removing such scaling back into the aquifer.

Figure 3:
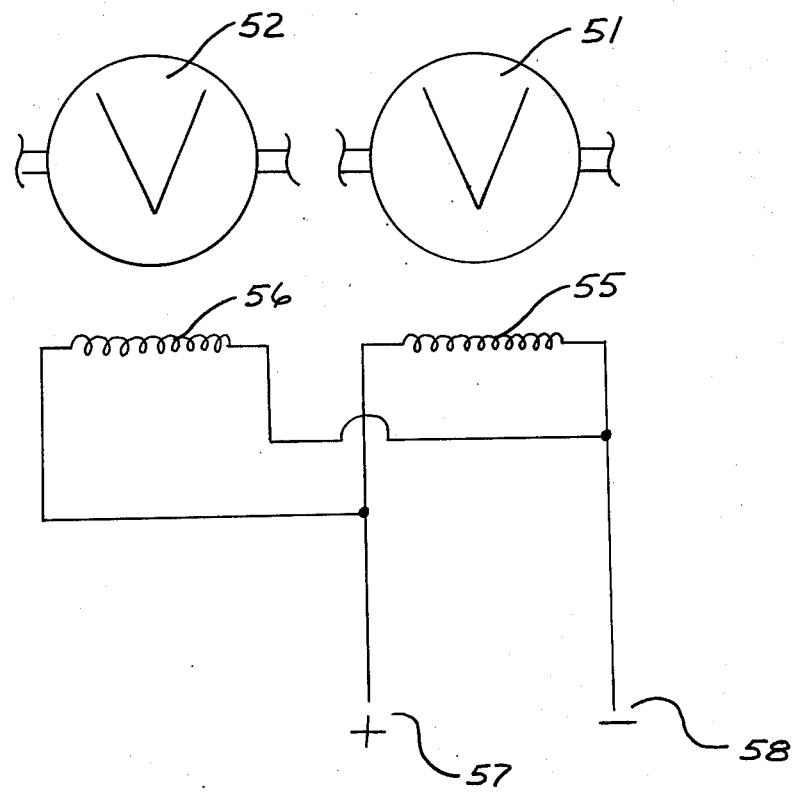
FIG. 3 is a schematic representation of the valving arrangement for each of the wells.

The operation of the valves of course is very simple. Each set of two valves for each well, such as in the illustration in FIG. 3 for the valves of well 50 will be so arranged that when the valve 52 is closed, valve 51 will be open. Preferably such valves will be solenoid operated, although they can be hand operated as will be understood. When solenoid operated, power at 57 and 58 will be applied simultaneously to the two coils and 52 which is now closed will now open, and 51 which is now open will close. The next time power is applied the reverse will take place and such operation of valving is understood. Each set of valves for each well will always act in a like manner. That is, when valve 11 for example is open, valve 12 will be closed and vice versa. The same will apply for all of the wells.

While the embodiment of this invention shown and described is fully capable of achieving the objects and advantages desired, it is understood that this embodiment is for purposes of illustration only and not for purposes of limitation.

I claim:

1. The method of enhancing the flow of hot acquifer from a geothermal energy source and through energy extracting means and return to a position beneath the surface of the earth including: 1. Providing a plurality of wells interconnecting from the surface of the earth to a location beneath the surface of the earth wherein at least one, of which wells intersects a subsurface hot acquifer; 2. Causing hot acquifer to flow from said source of hot acquifer intersected by said well, through said well to energy extracting means located adjacent to the surface of the earth; 3. Causing said hot acquifer to pass through said energy extracting means diminishing its temperature in so doing; 4. Removing effluent from said energy extracting means and passing it to a subsurface area through at least one other well of said plurality of wells, simultaneously introducing into said effluent a fluid of a lower temperature than the effluent in order to reduce pressure in the effluent and return line.

2. The method of claim 1 wherein water is mixed with the effluent which is passed back to the aquifer.

3. Apparatus for enhancing the extraction of energy from, and the flow through an energy extracting device of, hot acquifer from a geothermal source comprising: 1. A plurality of wells interconnecting from the surface of the earth to a position beneath the surface of the earth, wherein at least one of said wells interconnects with a hot acquifer beneath the surface of the earth; 2. Conduit connecting the surface outlet of each of said wells with an energy extracting means, in such manner that flow may be from at least one of said wells through said energy extracting means and back into at least one other of said wells; 3. Means interconnecting said conduit means used for return from said energy extracting means to the well in which the hot acquifer is returned below the surface of the earth to introduce a source of fluid of a lower temperature than the acquifer returning from said energy extracting means into said well in conjunction with the hot acquifer from said energy extracting means.

4. The device of claim 3 wherein the exhaust from said energy extracting means is introduced into piping connecting to said wells by means of a venturi arrangement.

5. The method of enhancing the flow of hot acquifer from a subsurface source of hot acquifer through energy extracting means including: 1. Passing hot acquifer upward through a well from a source of hot acquifer below the surface of the earth to a point adjacent the surface of the earth; 2. Passing said hot acquifer into an energy extracting means; 3. Removing the acquifer from the energy extracting means; 4. Mixing said hot acquifer with a cooler fluid than said acquifer after it passes through said energy extracting means and returning the mixture of acquifer and cooler fluid through a well to a subsurface location at approximately the same depth beneath the surface of the earth as the depth from which the acquifer was originally extracted.

* * * * *